Oct. 20, 1970     N. C. CALKINS     3,534,991
JOINT ASSEMBLY FOR CERAMICS AND METHOD FOR MAKING SAME
Filed Nov. 1, 1968
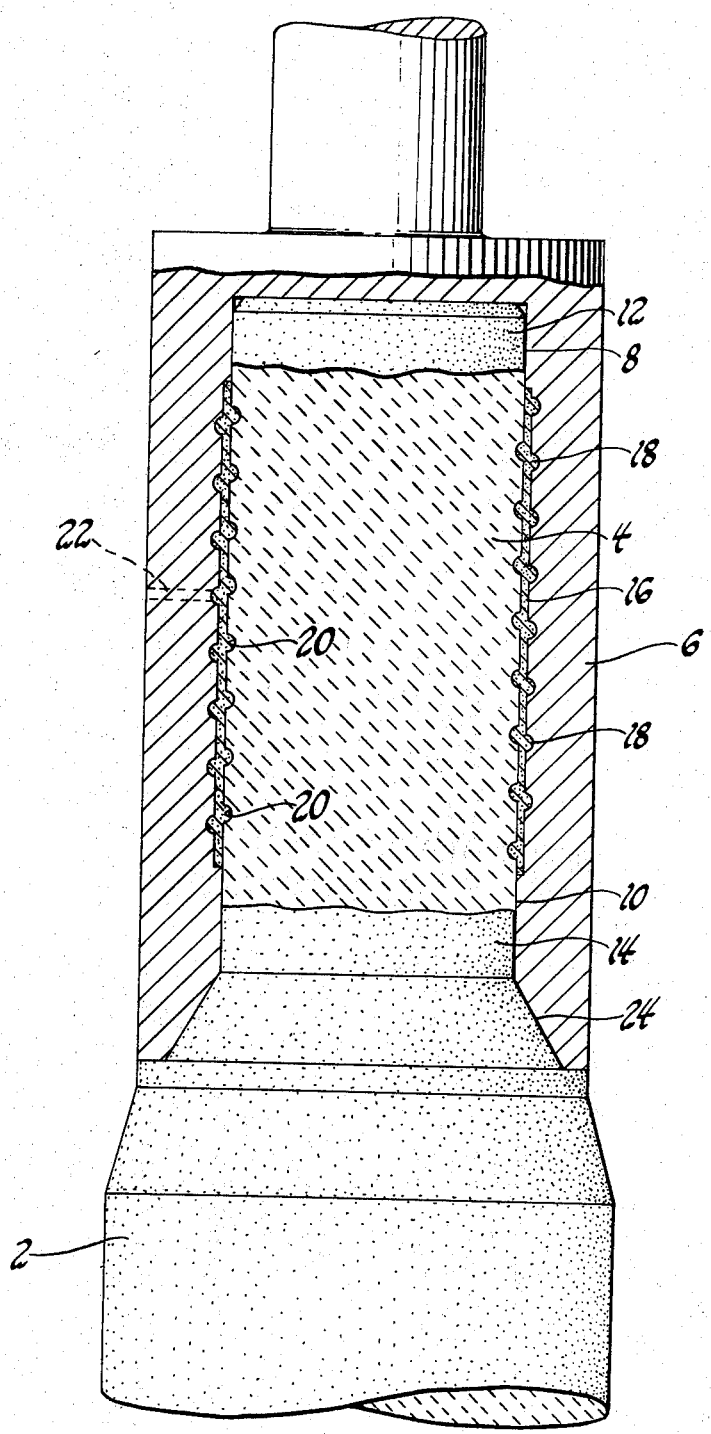
INVENTOR.
*Noel C. Calkins*
BY
*Barnard, McGlynn & Reising*
ATTORNEYS United States Patent Office 3,534,991
Patented Oct. 20, 1970

3,534,991
JOINT ASSEMBLY FOR CERAMICS AND METHOD FOR MAKING SAME
Noel C. Calkins, Littleton, Colo., assignor to Coors Porcelain Company, Golden, Colo., a corporation of Colorado
Filed Nov. 1, 1968, Ser. No. 772,562
Int. Cl. C03c 27/04
U.S. Cl. 287—189.365                2 Claims

ABSTRACT OF THE DISCLOSURE

The joint assembly described herein has an outer member with an opening therein and an inner member mated into the opening and secured therein by a bonding material. One of the members is ceramic and the other metal, ceramic or other hard material. In accordance with the invention, the assembly includes a plurality of centering elements interacting between the members at axially spaced locations to prevent transverse movement or cocking of either of the members with respect to the other. This assures against crushing of the bonding material, with resultant failure of the joint, in the event one of the members is subjected to an eccentric load tending to cock it with respect to the other member. In the preferred embodiment the members are of cylindrical shape and the centering elements consist of a pair of axially spaced lands on at least one of the members which are in abutting relationship and thereby interact with surface portions of the other member to thereby provide the desired centering. In this preferred embodiment the bonding material is in the annular groove which constitutes the space between the lands.

---

This invention relates to an assembly joint between a ceramic member and a member of the same or other hard material. The invention has particular utility for ceramic-to-metal joints and particularly to abrasion and wear resistant ceramic-to-metal composite pump plunger assemblies and hence will be described specifically with reference thereto.

For main types of pumps, particularly those for pumping materials containing abrasive particles, it is common practice to form the pump plunger as well as other components of high-alumina ceramic because of the outstanding ability of this material to withstand abrasive wear. This generally requires joining the ceramic component to a machined metal fitting. In the case of a pump plunger, for example, the high-alumina ceramic component consists of a rod to which there is joined, at one end thereof, a metal cap through which the reciprocating motion is imparted to the plunger. It is difficult to attain a high strength joint between ceramic and metal. At the present state of the art, the common practice is to form the end of the high-alumina ceramic rod and the interior surfaces of a cap to relatively close tolerances, and then bond the rod into the cap by means of a layer of epoxy resin which can be applied to the end of the rod before it is inserted into the cap after which the epoxy is allowed to cure. This requires the use of accurate jigs and fixtures during processing to assure that the cap is maintained concentric with the rod during the period the bonding resin cures to hardness. Such need for accurate jigging of course adds to the cost of manufacturing. Further, experienec has shown that failures do occur using such a joint structure and I have discovered that the failures generally result from the occasional eccentric loads which can occur such as tend to cause the cap to cock with respect to the rod. I have found that when this happens tremendous compressive forces can be placed on the epoxy resin to the extent that the resin is crushed thereby weakening the bond and eventually leading to failure, i.e., separation of the rod from the cap.

It is an object of the present invention to provide a joint structure between a ceramic member and another member which can be of ceramic, metal or other hard material, which joint structure provides greatly increased durability and assurance especially against failure resulting from eccentric loads being applied to the joint. Another object of the invention is to provide an improved joint of the type described which eliminates the need for accurate jigging during manufacture and which is therefore less costly.

Briefly, these objects are accomplished in accordance with the invention by incorporating in the joint a plurality of centering elements which interact between the joined members at axially spaced locations along the axis of the joint to prevent transverse movement or cocking of one of the members with respect to the other. In the preferred embodiment the centering elements comprise a pair of axially spaced annular lands formed on one member which are in closely fitted abutting relationship with circumferential surfaces of the other member and with the bonding material filling the annular groove which constitutes the space between the pair of lands. Such joint structure can be accomplished either by applying the bonding material before insertion of one member into the other or by fitting one member into the other and then injecting the bonding material into the groove between the pair of lands through a small opening provided in the wall of the outer member. With such structure, when an eccentric load is applied, the entire load is taken by the axially spaced abutting surfaces of the members and hence there is no compressive load on the bonding material.

Other objects, features and advantages of the invention will appear more clearly from the following description of a preferred embodiment made with reference to the drawing which shows a side view, partially in section, of a ceramic-metal pump plunger assembly embodying the invention.

Referring now to the drawing, the pump plunger assembly shown comprises a sintered alumina-base ceramic cylindrical rod 2 having an end portion 4 of reduced diameter which is bonded within a cylindrical steel cap 6. The precise exterior shape of the metal cap is of no importance to the invention; suffice it to say that the cap is machined or otherwise formed to meet the needs of a given pump installation, the function of the cap being to transmit the reciprocating motion to the ceramic pump plunger.

In accordance with the invention, the interior cylindrical surface of the cap is formed with two axially spaced annular lands 8 and 10 which are in snugly fitted abutting relationship with axially spaced circumferential surfaces 12 and 14, respectively, of the ceramic plunger portion 4. The space between the pairs of abutting lands constitutes a groove 16 which is filled with bonding material, preferably epoxy resin. To provide greater bonding area and also to provide a stronger mechanical interlock between the hardened bonding resin and the joined members, it is desirable that the wall or walls of the groove have depressions and projections, rather than being smooth, and to this end the interior surface of the cap, between the lands 6 and 8 and to which the resin is bonded is machined or otherwise formed to provide a helical counter-groove 18. Likewise, the surface of the ceramic plunger is provided with a helical groove as shown at 20. Other forms of irregular surfaces can of course be used. For example, a plurality of circumferential axially spaced counter-grooves could be used in the cap and just an irregular rough surface used on the ceramic member.

To manufacture the assembly the bonding material can be applied to the inner grooved surface of the cap 4 and to the cylindrical surface of the ceramic plunger portion 4 prior to inserting the plunger portion 4 into the cap, or, alternatively, the parts can be assembled and the bonding material then injected into the groove 16 through a small opening in the cap member as shown at 22.

The open end of the cap 6 is formed with a smooth frusto-conical surface 24 which mates against a frusto-conical surface on the plunger 2. This provides additional surface-to-surface contact between the members.

The ceramic plunger 2 is preferably formed of sintered alumina base ceramic containing upwards of 85% by weight aluminum oxide and any remainder either glass forming ingredients such as silica plus alkali or alkaline earth metal oxides or the like, or crystal growth inhibiting metal oxides, mineralizers or the like as well known in the art. Such sintered alumina base ceramics are well known and in common use. They are extremely hard and tough and hence can, like the metal of the cap 6, take extremely high compressive and other loads without hazard of fracture or other failure. Hence, the contact between each of the lands 8 and 10 and the surfaces 12 and 14, respectively, assures against compressive loads being applied to the bonding material such as would tend to crush the bonding material and thereby lead to joint failure. As a result, the assembly of this invention provides greatly increased durability for ceramic-to-metal joints. Further, the provision of the interacting surfaces 8, 10, 12 and 14 enables the attainment of perfect concentricity between the cap and the plunger without the use of accurate jigging during manufacture prior to full hardening of the bonding material. This enables a cost saving in manufacture.

It will be understood that while the invention has been described specifically with reference to a particular preferred embodiment thereof, various changes and modifications may be made all within the full and intended meaning of the claims which follow.

The embodiments of the invention in which an exclusive property or privilege is claimed are defined as follows:

1. A plunger assembly comprising a hollow, metallic member having a cylindrical interior surface opening axially from one end thereof, the interior surface having axially spaced lands of a first interior diameter and an area between the lands of greater interior diameter, groove means including a plurality of axially spaced portions in the area between the lands, an alumina, ceramic cylinder disposed in the hollow member and having the exterior surface engaging the spaced lands, groove means including a plurality of axially spaced portions in the exterior surface of the cylinder, the last-mentioned portions being axially offset from the groove portions in the area between the lands, a bonding material in the area between the lands to bond the member to the cylinder, said metallic member and said cylinder having mutually engaging frusto-conical surfaces adjacent said one end of the cylinder.

2. The plunger assembly defined in claim 1 wherein the groove means in the metallic member and the alumina ceramic member are helical.

References Cited

UNITED STATES PATENTS

| 1,292,072 | 1/1919 | Rooney. | |
| 1,871,371 | 8/1932 | Jackson | 285—238 |
| 2,040,092 | 5/1936 | Leedy | 285—287 |
| 2,879,323 | 3/1959 | Nichols et al. | 174—182 |

FOREIGN PATENTS

| 716,469 | 8/1965 | Canada. |
| 801,863 | 1/1951 | Germany. |

EDWARD C. ALLEN, Primary Examiner